Patented June 30, 1931

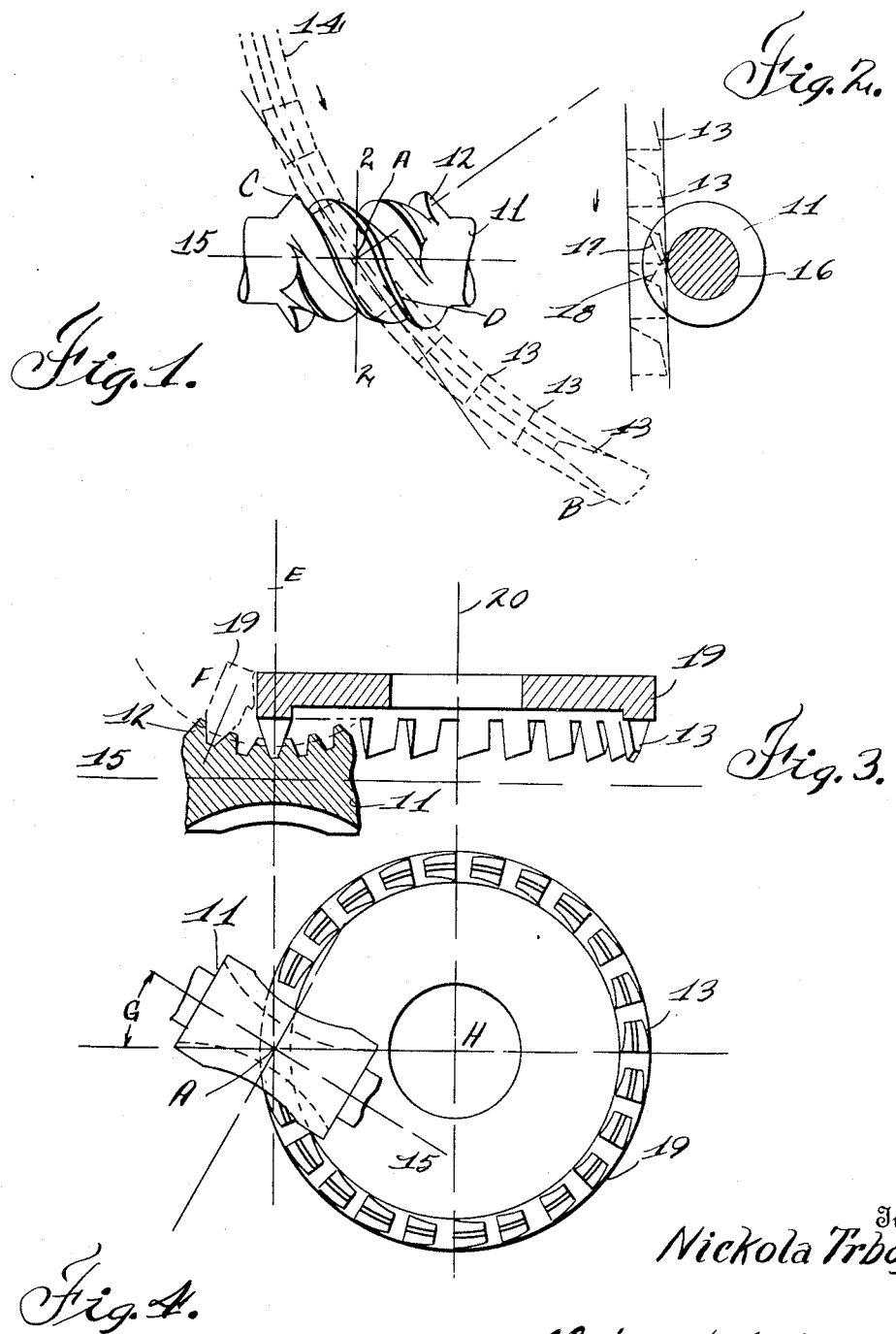

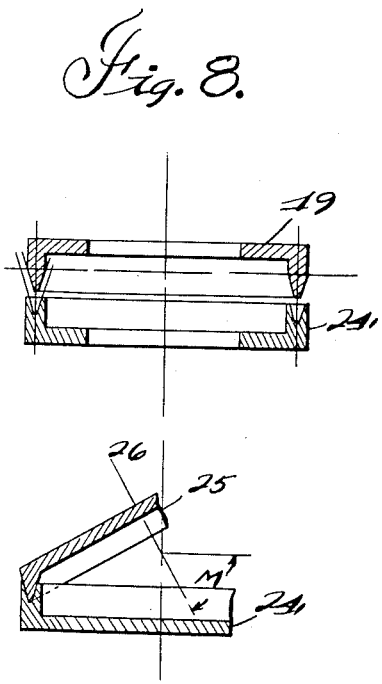
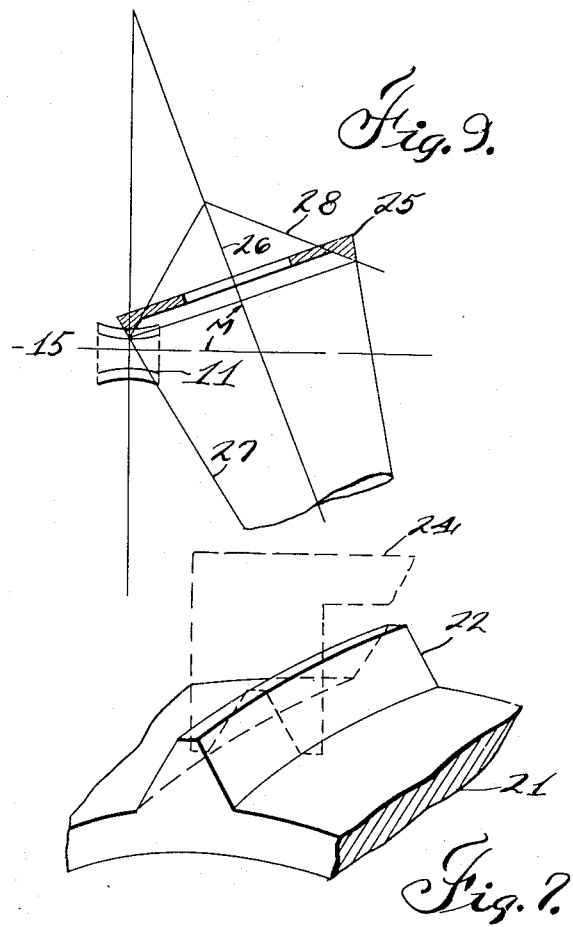
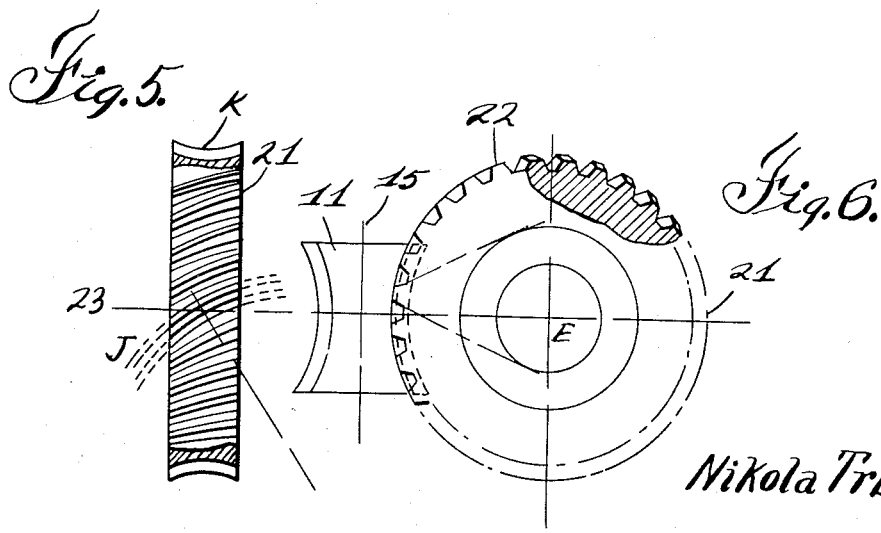

1,812,384

UNITED STATES PATENT OFFICE

NIKOLA TRBOJEVICH, OF HIGHLAND PARK, MICHIGAN, ASSIGNOR TO THE TIMKEN-DETROIT AXLE COMPANY, OF DETROIT, MICHIGAN, A CORPORATION OF OHIO

METHOD FOR GENERATING GEARS

Application filed August 6, 1928. Serial No. 297,764.

The invention relates to an improvement in worm gearing and refers in particular to gearing of the Hindley or globoid type.

The history of this type of gearing shows that the worm members of such drives originally were made like true globoid screws having their threads of a constant pitch, contour and thickness in the axial or midplane. Dr. Lanchester improved upon this construction by adopting a worm member, the threads of which were generated by means of a large hoblike tool of the same pitch diameter as the mating worm gear, said generating tool having its cutting edges disposed above and below the midplane of the worm whereas prior to Lanchester all generating edges were in the midplane. Still further modifications were made by Bostock, Guest, Wildhaber and myself by attempting to generate the worm threads by means of disk cutters or by the equivalent means of a rack tool reciprocating in a straight line transverse to the axis.

In the present construction the globoid worms are generated by means of a rack or V-shaped tool but the tool does not move or reciprocate in a straight line transverse to the axis of the worm as formerly was suggested but moves in a circular path. In the following description it will be shown that this method while producing a more or less non-symmetrical thread contour in the worm is, nevertheless, theoretically correct providing the mating worm and gear are cut and assembled in their proper relative positions. The advantage of having the generating tool move in a circular path is mainly of a practical nature since it permits the use of a Gleason type face cutter instead of a reciprocating tool or disk cutter as heretofore for the generation of worm threads, thus simplifying the operation. It will be readily understood that a tool moving in a circular orbit and in a plane tangent to the work will return after each complete revolution of the cutter to its exact initial position and thus will act as a shaping surface thereby affecting the necessary generative action upon the worm threads.

The main objects of this invention are first to simplify the method of producing globoid worms; second to produce worms of such a shape that they may be readily ground in the threads after hardening; third to simplify the structure and the manufacture of the mating worm wheel.

This application refers more particularly to the method of generating the worm, while the worm itself is the subject matter of a co-pending application.

In the drawings

Figure 1 is a diagram showing the method of generating a globoid worm by means of a shaping tool moving in a curved path;

Figure 2 is a section in the plane 2—2 thereof;

Figure 3 diagrammatically shows in elevation the method of generating the improved worm by means of a Gleason cutter;

Figure 4 is the plan view of Figure 3;

Figures 5 and 6 show two views of the improved worm gear capable of meshing with the improved worm;

Figure 7 shows on an enlarged scale the formation of a single tooth of the worm gear shown in Figures 5 and 6;

Figure 8 shows two complementary cutters, one for the improved worm and the other for the gear, intended to cooperate;

Figure 9 shows a modification of the method in which a special conical cutter is employed;

Figure 10 shows the profile formation of the conical cutter depicted in Figure 9.

The basis of this invention will be best understood from Figures 1 and 2. The globoid worm 11 having a plurality of threads or teeth 12 is acted upon by means of a series of rack shaped tools 13 all moving in the circular orbit 14. The cross section of said shaping tool is shown at B, Figure 1. The generation of worm threads is completed in this manner: While the tools 13 move continuously in their orbit 14, the worm 11 rotates about its axis 15 and is also simultaneously translated in a timed relation in the midplane in a circular orbit. The midplane is perpendicular to the sheet of paper in Figure 1 and passes through the axis 15, while the center of the orbit of the worm 11 coincides with the center E, Figure 3 of mating wheel.

As shown in Figure 2, the tools 13 move in a tangential direction relative to the momentary root circle 16, from which it follows that the said tools will produce the maximum depth of cut at the instant when they pass through the midplane of the worm. However, they will also remove metal both on approach and recess due to the well known "helical interference" which cannot be avoided in such methods of generating. Thus, geometrically, the formed thread surfaces of the worm are the envelopes of the circular V-shaped ring surface 14, Figure 1 and will contact with the same at each instant along the two curves 17 and 18, Figure 2 respectively, one curve for each side of the thread. Said curves of momentary contact are known in mathematics as the "characteristics" of the generated surface and have the interesting property that they lie both in the generating and the generated surface in their entire lengths. Inasmuch as the generating surface on one side of the worm thread is the convex face of a circular cone, and on the other side a concave face of another cone, it follows that the new thread surfaces are entirely built up from a series of curves, all said curves having the common property in that they lie in a conical surface. The two curves 17 and 18, however, will not be alike or symmetrical and, furthermore, their lengths and curvatures will also continually change as the worm 11 is rotated and translated lengthwise as already stated.

As is seen in Figure 1 the circular orbit 14 in which the generating tools are translated, is tangent to the thread helix at the point A in the midplane and interferes with the said helix at the point C on approach and the point D on recess. As the interferences at C and D are not alike it follows that the thread contours, as measured in the midplane, will not be symmetrical to each other with the consequence that the worm thread profiles as measured in the midplane are of a variable contour and are not alike at the driving and the coasting sides.

Figures 3 and 4 diagrammatically show in two projections the method of applying a Gleason cutter 19 to the generation of the threads 12 of the globoid worm 11. During this process the cutter 19 rotates about its stationary axis 20, Figure 3 and the worm 11 rotates about the axis 15 and is translated about the center E in a circular path. The relative position of the cutter with respect to the worm at the end of the generative movement is shown with dotted lines at F, Figure 3.

The method of offsetting the axis of the cutter relative to the axis of the worm is best seen in Figure 4. The cutter is adjusted so that the centerline of its cutting circle passes through the point A of the worm, and the center H of the said circle is offset relative to the axis 15 in order to produce the desired helical angle G.

A worm gear adapted to mesh with the new globoid worm 11 is diagrammatically shown in Figures 5 and 6. The gear 21 has a plurality of circular teeth 22 formed about its circumference. It is to be noted that said teeth are not of a generated tooth form but are simply cut into the blank at spaced intervals by means of a circular cutter, the blank standing still during each such cut. As these teeth 22 are inclined at the desired helical angle relative to the gear axis 23 as indicated at J, Figure 5, it follows that they may be classified as curved hyperboloidal rack teeth and the gear in its outward appearance will resemble the gorge portion of a hyperboloid of revolution, i. e. it will be hollow in its midplane, as indicated at K, Figure 5.

Figure 7 shows on an enlarged scale the formation of a single tooth 22 of the gear 21. The body of said tooth is a segment of a V-shaped circular ring and may be swept by means of the tool 24 when said tool is moved in a circular path.

The theory of this gearing requires that the curved tooth 22, Figure 7 be of exactly the same curvature, thickness, etc. as the cutting path of the cutter 19, Figure 3. This may be accomplished by the selection of two complementary cutters, one to cut the worm and the other the gear. As illustrated in Figure 8, the cutters 19 and 24 are of exactly the same diameter and are complementary to each other, i. e. when superposed one over the other they will have a complete surface contact. From this we are in a position to show that this method is theoretically correct, i. e. that the finished worm and gear will mesh at a constant velocity and their corresponding teeth will always have a line contact with each other. The method of generating the worm, as already explained, is such that the thread surfaces are the geometrical envelopes (of a single parameter) of the conical cutter surface and must therefore possess characteristics of a conical curve type. As the rotation and the translation of the worm relative to the stationary cutter are timed according to a constant ratio, it also follows that the principle of constant velocities is properly taken care of. On the other hand, the wheel teeth all being the exact reproduction of the cutter and engaging the worm threads in exactly the same manner as the cutter does during the generation, will contact with the worm threads along the same above mentioned series of conical curves.

Figures 9 and 10 show a modification of the first described method of generating the worm 11. The cutter 25 having an axis 26 is no longer a Gleason cutter, but is a conical cutter having its cutting faces disposed in two concentric cones 27 and 28 of different degrees of angularity.

The two axes 26 and 15 of the cutter and worm respectively form now an acute angle M, which angle with a view upon the accuracy of the work to be produced should be selected as near to ninety degrees as practicable. The object of this modification is to sacrifice some of the theoretical exactness of the method for the purpose of a practical convenience in manufacture. As is seen in Figure 9, the body of the cutter 25 points now away from the work thus rendering it possible to support the axis 15 by means of bearings of an ample length and diameter in order to insure the rigidity of the work support during generation.

Figure 10 diagrammatically shows the formation of the modified worm cutter 25 from a given wheel cutter 24. The object is to produce as nearly as possible a surface contact to exist between the two complementary cutting surfaces. While the two surfaces never can agree with a theoretical exactness, however, they may be fitted sufficiently close to each other so as to fall within the practical working tolerances, customary in this class of work.

From the foregoing description, it will be evident that the new process is adapted to grinding as well as to milling operations. Also, the gear member of the drive may be manufactured by some other method than the one described such as, for instance, by the hobbing process in which case the hob should be preferably of an hour-glass shape exactly corresponding in all its principal dimensions to those of the mating worm.

The gear member of the drive may be manufactured in an ordinary milling machine if form-cut as previously described, or in an ordinary hobbing machine if finished by means of an hour-glass hob.

The worm member may be generated in a special machine adapted to generate globoidal worms. A machine of that kind is illustrated and described in my copending application Serial No. 186,514, filed April 25, 1927.

It will be evident that by this method common or straight type worms and screws may also be produced. In that case the method becomes very much simplified due to the fact that the worm in this case will be translated during the generation in a direction parallel to its own axis instead of circular path drawn about an outside fixed center as in the case of the globoidal worms.

What I claim as my invention is:

1. A method of generating worms consisting in selecting a cutter of the face mill type having convex and concave generating surfaces, in placing the said cutter in a tangential relation relative to the work, in offsetting the center of the cutting circle relative to the axis of the worm to produce the required helical angle, in rotating the worm about its axis and in translating the worm in its axial plane, the two last named motions being in a timed relation relative to each other.

2. A method of generating globoid worms consisting in selecting a cutter of the face mill type having convex and concave generating surfaces, in placing the said cutter in a tangential relation relative to the work, in offsetting the center of the cutting circle relative to the axis of the worm to produce the required helical angle, in rotating the worm about its axis and in translating the worm bodily in its axial plane about a fixed center lying in the said plane, the two last named motions being in a timed relation relative to each other.

3. A method of generating a pair of mating gears comprising a globoid worm and a hyperboloidal mating wheel in which a pair of complementary cutters of the face mill type are selected both having convex and concave generating surfaces, the cutters being capable of contacting with each other in substantially a surface contact, in generating the threads in the worm by holding the worm cutter relatively stationary and by imparting to the worm a rotation and a translation in a circular orbit in a timed relation to generate the tooth curves, and in form cutting the gear teeth by holding both the cutter and the work axes relatively stationary at the end of the finish cut.

4. A method of generating worms consisting in rotating a plurality of cutting tools in a circle about an axis including an angle less than ninety degrees with the axes of the said tools, in which the circle described by the said tools is in a tangent direction at the point of contact to the worm helix and in which the worm is given a relative timed rotation and translation to complete the helix from end-to-end.

5. A method of generating globoid worms consisting in rotating a plurality of cutting tools in a circle about an axis including an angle less than ninety degrees with the axes of the said tools, in which the circle described by the said tools is in a tangent direction at the point of contact to the worm helix and in which the worm is given a relative timed rotation and a longitudinal translation in a circular arc to complete the helix from end-to-end.

In testimony whereof I affix my signature.

NIKOLA TRBOJEVICH.